Figure 1:
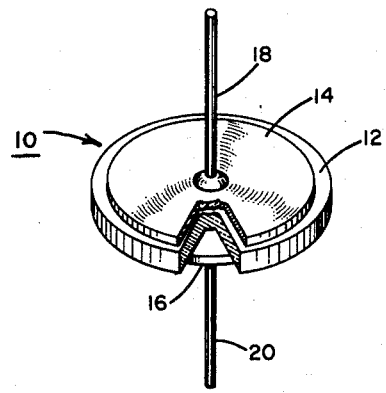

INVENTORS
JOHN KOENIG
BERNARD JAFFE

ATTORNEY

United States Patent Office 3,153,179
Patented Oct. 13, 1964

3,153,179
CERAMIC CAPACITOR DIELECTRICS
John Koenig, Euclid, and Bernard Jaffe, South Euclid,
Ohio, assignors to Clevite Corporation, a corporation
of Ohio
Filed Aug. 17, 1962, Ser. No. 217,584
9 Claims. (Cl. 317—258)

This invention relates to ceramic compositions of matter and particularly to ceramic capacitor dielectrics useful at high temperatures.

The use and attendant advantages of ceramic material as a capacitor dielectric is well-known. However, the service applications of ceramic capacitors are limited by various factors among the more prominent of which is the well-known tendency of the ceramic to exhibit marked changes in various properties with variations in ambient temperature. A particular shortcoming in this regard is the rapid decrease in electrical resistivity of the ceramic material with temperature which precludes its use in many areas.

In connection with the effects of temperature on electrical and physical properties of ceramic materials it should be noted that many dielectric ceramics are ferroelectric and exhibit astonishingly high dielectric constant by virtue of the fact that such materials are characterized by permittivity maxima in the vicinity of their Curie temperatures. As a result, the operating temperature of such materials must be confined to a relatively narrow range either to exploit the high permittivity and/or to prevent radical changes in dielectric constant. The present invention is not concerned with dielectric materials of this type but rather materials which are not ferroelectric and do not depend on the peaks of permittivity which accompany phase transitions.

It is a fundamental object of the present invention to provide dielectric ceramic compositions overcoming at least one of the problems of the prior art as outlined above.

A more particular object is the provision of novel ceramic compositions characterized by general excellence of their dielectric, electrical, and physical properties and particularly their relatively high electrical resistivity at temperatures approaching 500° C.

Another object is the provision of ceramic capacitor dielectrics characterized by unusually high values of RC product and low temperature dependence of permittivity.

These and further objects are fulfilled by dielectric ceramic compositions in accordance with the present invention which consist essentially of zirconium and barium in oxide form combined in stoichiometric proportions corresponding to barium zirconate, $BaZrO_3$, and modified by substitution of relatively small quantities of at least one other element for at least one of the elements barium and zirconium, elements substituted for barium being selected from the group consisting of the rare earth elements and, for zirconium, from the group consisting of niobium and tantalum, the aggregate quantity of substituted elements being in the range of 0.5 to 10 atom percent.

Figure 2:
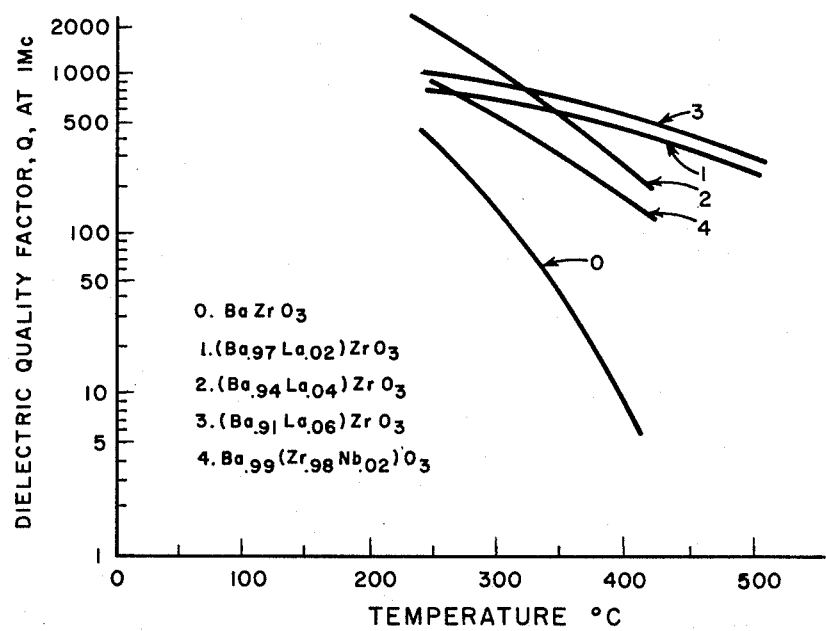
Figure 3:
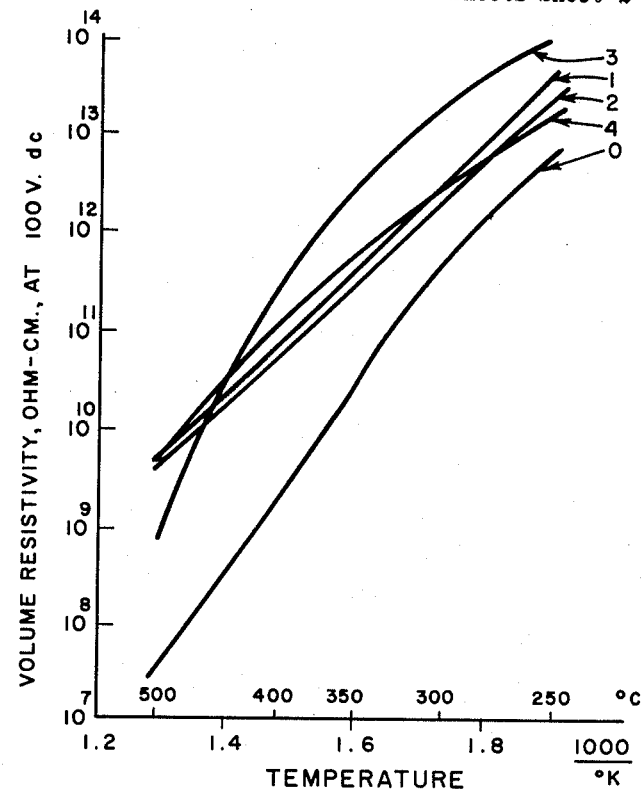
Figure 4:
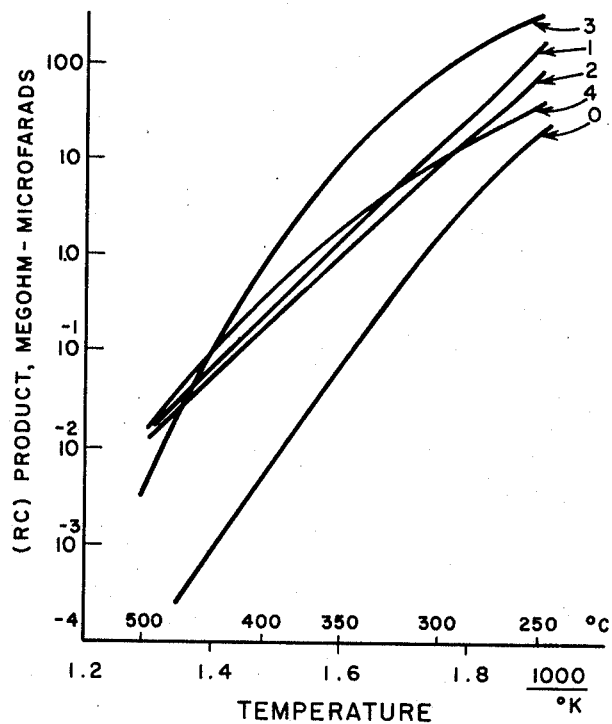

These and additional objects of the invention, its advantages, scope and the manner in which it may be practiced will be readily apparent to those conversant with the art from the following description and subjoined claims to be read in conjunction with the annexed drawing in which, FIGURE 1 is a perspective view of a stereotype ceramic capacitor embodying the present invention;

FIGURES 2, 3 and 4 are graphic representations of the temperature variation of dielectric quality factor, Q, volume resistivity, R, and RC product, respectively, of various dielectric ceramics in accordance with the present invention compared with barium zirconate.

Refering to FIGURE 1, 10 designates generally a ceramic capacitor illustrated in stereotyped form. Capacitor 10 consists of a disk 12 of dielectric ceramic material interposed between electrodes 14 and 16 consisting of electrically conductive material applied in any suitable manner to the major faces of the disk. Each electrode is provided with a respective conductive lead, 18 and 20, secured thereto by soldering or other suitable method of attachment.

In accordance with the present invention disk 12 consists of a fired ceramic material of particular composition as will now be described.

The basic constituents of the ceramic composition are barium and zirconium in oxide form combined in substantially stoichiometric proportions corresponding to barium zirconate. This basic ingredient is, of course, well known. It has a dielectric quality factor of 360 at 250° C. (measured at one mc.) but this drops rapidly with increasing temperature, reaching 5 at about 400° C. The volume resistivity of barium zirconate is satisfactory at room temperature and acceptable up to temperatures in the order of 200° to 250° C. where it has a value of about $10^{13}$ ohm-centimeters measured at 100 volts D.C.; thereafter, however, resistivity drops rapidly with increasing temperature soon reaching the rate of a full order of magnitude decrease per 50° C. rise in temperature.

The RC product, another measure of excellence for capacitor dielectrics, also drops rapidly with rising temperature in barium zirconate, e.g., from values higher than 10 megohms-microfarads at temperatures below 250° C. to values approaching $10^{-4}$ at 500° C.

The present invention is based on the discovery that capacitor dielectrics of vastly improved high temperature properties can be fabricated of ceramic compositions which can be viewed as chemical modifications of barium zirconate. The ceramic materials contemplated by the invention exhibit significantly higher values of dielectric quality factor, volume resistivity and RC product at all temperatures and retain these properties to a useful degree at temperatures ranging up to 500° C.

The compositions contemplated by the present invention are of perovskite crystal structure and have the type formula $ABO_3$, corresponding to barium zirconate ($BaZrO_3$). They may be considered as derived from barium zirconate by the substitution of one or more of the rare earth elements for a minor fraction of the barium, ranging from 0.5 to 10 atom percent in the aggregate. Alternatively, a minor fraction of the zirconium may be substituted by niobium and/or tantalum, in aggregate quantities ranging from 0.5 to 10 atom percent. If desired, the foregoing substitutions can be employed jointly, i.e., at both the A and B positions in a single composition; in this case the aggregate quantity of substitutional elements, regardless of lattice sites, should be in the same range as for substitution at a single position, viz., 0.5 to 10 atom percent.

Inasmuch as La is trivalent, it is assumed that each two atoms of it substitute for three divalent Ba atoms, leaving Ba (A ion) vacancies in the lattice. In a similar manner, the pentavalent Nb when substituted for quadrivant Zr is assumed to be "balanced" by Ba vacancies, each two Nb atoms resulting in one such Ba vacancy.

The probable truth of this is brought out by the similar effect of La and Nb in enhancing the electrical properties, particularly volume resistivity at elevated temperature.

The preferred ranges of substitution are 2 to 6 atom percent, as these yield the best all round improvement in significant properties with the least side effects or none at all. Among the rare earth substituents, lanthanum is preferred because of its relatively low cost and ready availability in suitable form ($La_2O_3$) and purity. It will be appreciated, of course, that many of the rare earth elements are so costly as to render their use in commercial compositions according to this invention, economically impractical, albeit theoretically operative. The same is true of hafnium which is well known to be an equivalent of, and frequently occurs as an impurity in, zirconium. Therefore, in the present description and subjoined claims, it is to be understood that the designation zirconium is not intended to exclude the presence of hafnium impurities.

As regards electrical and dielectric properties, the ceramic materials contemplated by the invention are particularly noteworthy for their ability to maintain useful values at high temperatures, ranging up to 500° C. At 350° C. the preferred compositions, described hereinbelow, have dielectric constants of about 36, dielectric quality factors of 400 or higher, volume resistivities of about $5 \times 10^{11}$ ohm-centimeters, and RC products of at least one megohm-microfarad. Moreover, the change (decrease) of dielectric constant between room temperature and 250° C. was only about 4%.

The following tabulations (Tables I and II) present the composition of and pertinent data on several examples of preferred dielectric ceramic materials according to the present invention, unmodified barium zirconate (Example 0) being included as a basis for comparison.

*Table I*

| Example Number | Composition | Dielectric Constant, K, at 1 mc, 23° C. | Breakdown Field [1] at 100° C., kv./cm. | Dielectric Quality Factor, Q, at 1 mc. Temperature, ° C. | | | | |
|---|---|---|---|---|---|---|---|---|
| | | | | 250° | 300° | 350° | 400° | 500° |
| 0 | $BaZrO_3$ | 37.8 | | 360 | 135 | 40 | 8.5 | |
| 1 | $(Ba_{.97}La_{.02})ZrO_3$ | 39.7 | 160 | 760 | 700 | 610 | 485 | 250 |
| 2 | $(Ba_{.94}La_{.04})ZrO_3$ | 39.8 | 160 | 1,900 | 1,100 | 410 | 260 | |
| 3 | $(Ba_{.91}La_{.06})ZrO_3$ | 40.5 | 210 | 940 | 840 | 660 | 510 | 170 |
| 4 | $Ba_{.99}(Zr_{.98}Nb_{.02})O_3$ | 38.5 | 130 | 810 | 480 | 320 | 160 | |

[1] Measured on 10 mil thick wafers.

*Table II*

| Example Number | Composition | Volume Resistivity, $\rho$ Ω-cm. at 100 v. D.C. ($\times 10^{10}$) Temperature, ° C. | | | | | RC Product, MΩ-μf. Temperature, ° C. | | | | |
|---|---|---|---|---|---|---|---|---|---|---|---|
| | | 250° | 300° | 350° | 400° | 500° | 250° | 300° | 350° | 400° | 500° |
| 0 | $BaZrO_3$ | 600 | 46 | 2.8 | .13 | .003 | 18 | 1.3 | 0.09 | 0.004 | 0.0001 |
| 1 | $(Ba_{.97}La_{.02})ZrO_3$ | 4,300 | 280 | 37 | 8.4 | .48 | 145 | 9.4 | 1.2 | 0.28 | 0.015 |
| 2 | $(Ba_{.94}La_{.04})ZrO_3$ | 2,400 | 160 | 31 | 6.7 | .41 | 80 | 5.2 | 1.0 | 0.22 | 0.013 |
| 3 | $(Ba_{.91}La_{.06})ZrO_3$ | 8,700 | 2,200 | 190 | 23 | .087 | 296 | 73 | 6.3 | 0.73 | 0.003 |
| 4 | $Ba_{.99}(Zr_{.98}Nb_{.02})O_3$ | 1,000 | 210 | 55 | 9.8 | .39 | 34 | 6.8 | 1.8 | 0.30 | 0.012 |

From Tables I and II it will be evident that the additions exemplified by compositions numbers 1, 2, 3 and 4 result in an increase in room temperature dielectric constant, as compared to $BaZrO_3$; however, it is at higher temperatures and in connection with dielectric quality factor, volume resistivity, and RC product that the magnitude of the improvement manifests itself. Thus, for example, at 250° C. the modified compositions exhibit values of dielectric quality factor ranging from over 100 to 500 percent higher than barium zirconate. Moreover, the percentage-wise improvement increases with increasing temperature, all of the exemplary compositions retaining usefully high dielectric quality factors up to 400° or 500° C.

The improvement in volume resistivity and RC product at high temperatures resulting from the additions follows the same general pattern as in the case of dielectric quality factor.

The extremely high values of breakdown field which characterizes the modified barium zirconate compositions should also be noted.

As previously explained substitutions may be made at both lattice sites, i.e., for both barium and zirconium. The results obtained by the double substitution are indicated by the data recorded in Table III which follows.

*Table III*

| Example Number | Composition | Dielectric Constant, K, at 1 mc. | | Dielectric Quality Factor, Q, at 1 mc. | |
|---|---|---|---|---|---|
| | | (250° C.) | (350° C.) | (250° C.) | (350° C.) |
| 0 | $BaZrO_3$ | 37 | 36.2 | 360 | 40 |
| 5 | $(Ba_{.98}La_{.01})(Zr_{.99}Nb_{.01})O_3$ | 39.3 | 37.6 | 600 | 310 |
| 6 | $(Ba_{.95}La_{.03})(Zr_{.99}Nb_{.01})O_3$ | 39.6 | 38.6 | 590 | 330 |
| 7 | $(Ba_{.97}La_{.01})(Zr_{.97}Nb_{.03})O_3$ | 37.6 | 36.2 | 1,200 | 390 |
| 8 | $(Ba_{.94}La_{.03})(Zr_{.97}Nb_{.03})O_3$ | 38.8 | 37.2 | 2,000 | 110 |

These materials, in the form of wafers 0.010 inch thick survived life tests of 1000 hours at 350° C. with an applied field of 60 volts per mil thickness. The final RC products were in the range 100–140 megohms-microfarad.

As in the case of the single substitution, there is a modest but unmistakable improvement in dielectric constant. The major effect, however, relates to other dielectric properties. Thus, for example, at 250° C. the modified compositions exhibit at least 67% higher dielectric quality factor than unmodified barium zirconate. Some compositions, for example No. 8, have a dielectric quality factor over 450% higher than unmodified barium zirconate. Moreover, there is also a marked increase in volume resistivity and RC product over unmodified $BaZrO_3$, although data on these properties are not included in Table III.

The effect of temperature variation on dielectric quality factor, volume resistivity, and RC product for Example Compositions Nos. 1, 2, 3 and 4, compared with barium zirconate, is graphically illustrated in FIGURES 2, 3 and 4, respectively.

The ceramic materials contemplated by the present invention can be prepared in accordance with well-known ceramic techniques. The ceramic specimens specifically described hereinabove were prepared in the following manner from micron-sized powders of the starting materials, namely, barium carbonate ($BaCO_3$), zirconium dioxide ($ZrO_2$), lanthanum oxide ($La_2O_3$), and/or niobium pentoxide ($Nb_2O_5$) as the case may be.

When calculating the required stoichiometric ratios the impurity contents of the raw materials were taken into account. After weighing, 50 gram batches of the powders were dry mixed on ball mill rollers in 250 milliliters plastic jars with six half-inch burundum stones for 10 minutes. Sufficient water was added to make a light slurry and wet mixing followed for five hours. After drying the slurry at 105° C. in a flat glass dish the cake was broken up in a hand mortar. The fine powder thus obtained was calcined in an alumina crucible at 1380° C. for three hours to effect reaction in the solid state.

The reacted product was ground up in a hand mortar to as fine a powder as possible, i.e., a particle size of 5 to 10 microns. To further reduce the particle size, the powder was ball milled for 15 hours in a plastic jar with sufficient water to make a creamy slurry. After addition of a binder consisting of 3% by weight of 1:1 mixture of CEREMUL-C and water, ball milling continued for another hour to fully disperse the binder. (CEREMUL-C is a commercially available product consisting of an aqueous dispersion, 41 to 46% solids, of paraffin, M.P. 122° F.).

The heavy slurry which resulted was dried in a flat glass pan at 80° C. and again the cakes were broken up in a mortar. The dried slurry was then pressed into disks which were placed on platinum coils in flat alumina dishes and heated slowly to 500° C. to drive out moisture and burn out the binder. Then the dishes were covered and the disks fired in a gas oven for one hour at the temperature producing the greatest density. The various compositions described above matured at temperatures ranging from 1600° to 1675° C. Excess air was supplied to the furnace during sintering to maintain an oxidizing atmosphere.

The fired disks were electroded in a conventional manner and electrical measurements made.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by United States Letters Patent is:

1. A dielectric ceramic composition consisting essentially of zirconium, oxygen and barium combined in substantially stoichiometric proportions corresponding to barium zirconate, $BaZrO_3$, and modified by substitution of relatively small quantities of at least one other element for at least one of the elements barium and zirconium, elements substituted for barium being selected from the group consisting of the rare earths and, for zirconium from the group consisting of niobium and tantalum, the aggregate quantity of substituted elements being in the range of 0.5 to 10 atom percent.

2. A dielectric ceramic composition consisting essentially of barium zirconate having 2 to 6 atom percent lanthanum substituted for 3 to 9 atom percent of its barium content.

3. A dielectric ceramic composition consisting essentially of barium zirconate having substitued for an equiatomic quantity of its zirconium content, 2 to 6 atom percent of an element selected from the group consisting of niobium and tantalum.

4. A dielectric ceramic composition consisting essentially of barium lanthanum zirconate having substantially the formula $(Ba_{.97}La_{.02})ZrO_3$.

5. A dieletric ceramic composition consisting essentially of barium lanthanum zirconate having substantially the formula $(Ba_{.94}La_{.04})ZrO_3$.

6. A dielectric ceramic composition consisting essentially of barium lanthanum zirconate having substantially the formula $(Ba_{.91}La_{.06})ZrO_3$.

7. A dielectric ceramic composition consisting essentially of barium zirconate niobate having substantially the formula $Ba_{.99}(Zr_{.98}Nb_{.02})O_3$.

8. A high temperature ceramic capacitor comprising spaced electrode means having interposed therebetween a dielectric ceramic material consisting essentially of barium zirconate modified by substitution of 2 to 6 atom percent lanthanum for 3 to 9 atom percent of the barium content.

9. A high temperature ceramic capacitor comprising spaced electrode means having interposed therebetween a dielectric ceramic material consisting essentially of barium zirconate modified by substitution of niobium for 2 to 6 atom percent of the zirconium content.

References Cited in the file of this patent

Goodman: "Ferroelectric Behavior in Barium Zirconium Metaniobate," J. Am. Cer. Soc., February 1960 (pages 105–113).